United States Patent [19]

Emonet

[11] 4,231,580

[45] Nov. 4, 1980

[54] LOST MOTION TOOL RETAINER

[76] Inventor: Henri Emonet, 12 rue R.P. Couturier, Montbrison - Loire, France

[21] Appl. No.: 931,517

[22] Filed: Aug. 7, 1978

[51] Int. Cl.$^3$ .............................................. B23B 31/02

[52] U.S. Cl. ..................................... 279/19.1; 279/19; 279/19.6

[58] Field of Search ........................ 279/19, 19.1, 19.6, 279/19.7, 19.5; 173/132, 139

[56] References Cited

U.S. PATENT DOCUMENTS

| | | | |
|---|---|---|---|
| 981,899 | 1/1911 | Taylor | 279/19 |
| 1,227,117 | 5/1917 | Christiansen | 279/19.6 X |
| 1,755,269 | 4/1930 | Pearson | 279/19.1 |
| 1,770,680 | 7/1930 | Tuttle | 279/19.1 |
| 1,776,922 | 9/1930 | Naismith | 279/19.1 |
| 1,832,471 | 11/1931 | Nell | 279/19 X |
| 2,572,840 | 10/1951 | Curtis | 279/19 X |
| 3,356,166 | 12/1967 | Diachenko | 279/19 X |
| 3,865,198 | 2/1975 | Price | 279/19.1 X |
| 3,910,590 | 10/1975 | Ekström | 279/19.1 |

FOREIGN PATENT DOCUMENTS

| | | | |
|---|---|---|---|
| 1128380 | 4/1962 | Fed. Rep. of Germany | 279/19 |

*Primary Examiner*—William R. Briggs
*Attorney, Agent, or Firm*—Remy J. VanOphem

[57] ABSTRACT

The invention permits the interchangeability of a variety of shifters on the same housing of a jack hammer. The one piece housing is provided with two appropriately placed lugs with coaxial holes which intersect with the central bore of the housing. By utilizing an appropriate sleeve, this housing can be used regardless of whether a spring pin type or a latch type shifter is used. With a spring pin shifter, the coaxial holes are used to lock the shifter in place and thereby contain the tool within the sleeve. With a latch type shifter, a groove in the sleeve is aligned with the coaxial holes permitting the insertion of a pin to hold the sleeve in the housing. Flanges on the sleeve provide the appropriate mounting means for the latch.

9 Claims, 8 Drawing Figures

LOST MOTION TOOL RETAINER

BACKGROUND OF THE INVENTION

1. Field of the Invention

This invention applies to a reciprocating, concrete-breaking, jack hammer type machine, especially designed to receive several varieties of shifters.

2. Description of the Prior Art

In the profession, the "shifter" is known as an element located at the lower part of a concrete breaking jack hammer, and used to hold the drill or the tool fitted in the concrete breaking machine, particularly as the assembly is lifted to pull off the tool.

There are two main types of shifters. The spring shifter consists of a resilient metal thread or wire bent in the shape of a double S. The free upper ends of the "pin" thus obtained are fitted into the holes provided on either side of the barrel of the machine. The central part of each S can rest and be locked on a pitched contact surface rigidly mounted with the barrel. Finally, the two S shapes are jointed in their lower restricted portion, to interface with a flange provided in the back of the working part of the tool. In another version, the shifter consists of a rigid lock including an offset latch in the lower portion, and which comes across the stroke of the tool flange. This lock is jointed on a spindle resting on a flange which is rigidly mounted on the body of the machine or jack hammer.

In the present state of the art, it is impossible to mount a spring type shifter on a jack hammer designed for a latch type shifter.

SUMMARY OF THE INVENTION

The present invention aims at overcoming this inconvenience by offering a jack hammer equipped with an interchangeable shifter, allowing for the easy mounting of one or the other type of shifter.

According to the invention, the body of a machine designed to be equipped with a reciprocating system for example, by the displacement, inside a cylinder, of a piston whose lower end acts on the shank of a tool moving inside a barrel, in particular in that the body includes the cylinder and the barrel built in one single element, the barrel including an internal bore and external shapes allowing for the installation of a separate, interchangeable locking device.

The body includes an axial internal bore, and a pitched contact surface is provided on the external face of the barrel along with two lugs pierced by coaxial holes ending in the internal bore; it is thus fitted for the installation of a spring type shifter.

A sleeve including a polygonal bore is used as a tool guide, and is press fitted in the lower bore of the barrel. The lower part of the sleeve is completed by a counterbore or shoulder which comes to rest on the internal face of the barrel at the moment of the press fitting. The shifter consists of a double S shaped pin, which is mounted on the body with its two ends bent in a right angle and routed in the lug holes. The central part of each resilient S can be stopped and locked on the respective pitched contact surface.

A second version consists of a latch type shifter jointed on a spindle which is supported by two sections forming an offset flange, rigid with the tool guide sleeve counterbore or shoulder, this sleeve is press fitted in the internal bore of the barrel so as to let a peripheral groove provided in its outside diameter come in alignment with the coaxial holes of the two barrel lugs. A pin can then be introduced in the groove to lock and axially stop the sleeve.

It is understood that a spring or latch type shifter can be mounted on a body made all in one piece, the holes leading to the internal bore of the barrel being used either as spring pin brackets or as a lock for the sleeve, which bore holds the tool. In both cases, the same sleeve including a flange and a peripheral groove can obviously be used:

- in the spring shifter version, the sleeve is not locked since it is not subjected to a downward stress:
- in the latch shifter version, the sleeve is locked but the pitched contact surfaces of the barrel are not being used.

BRIEF DESCRIPTION OF THE DRAWINGS

The attached drawings, given as non-exclusive examples, aim at a better understanding of the invention particulars.

DESCRIPTION OF THE PREFERRED EMBODIMENTS

Figure 1:
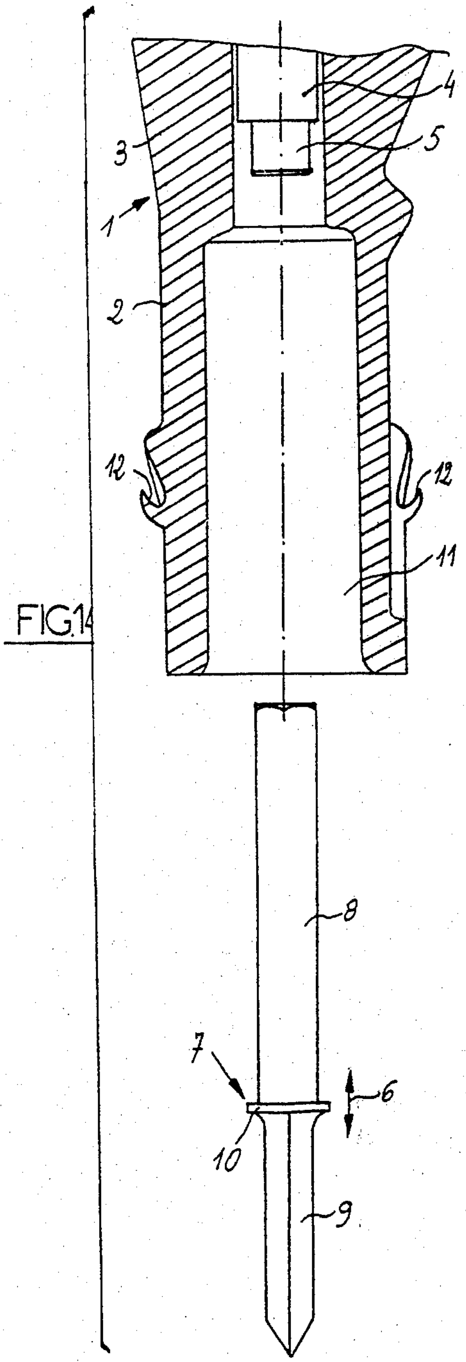
FIG. 1 is a cross section of the machine's single piece body according to the invention.
Figure 2:
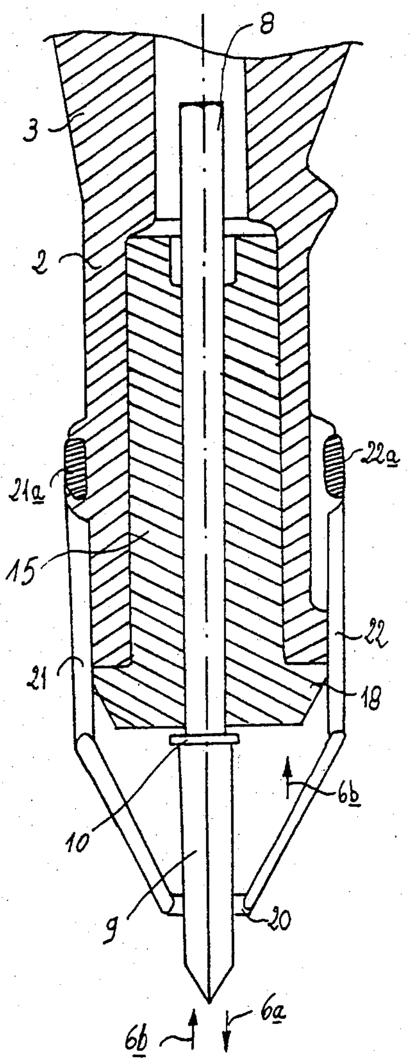
FIG. 2 shows the same cross section after installation of a spring type shifter.

FIG. 1 illustrates the body 1 of a concrete breaking jack hammer. This body is built in one piece, which means that one piece includes the barrel 2 and the cylinder 3 housing the reciprocating stroke of a piston 4. Following a familiar pattern, the shank 5 of the piston 4 knocks the back of the shank 8 of a tool 7 which moves axially in the direction of the double arrow 6, in the internal bore 11 of the barrel 2.

The working part 9 of the tool is kept separate from the shank 8 by a flange 10.

Figure 3:
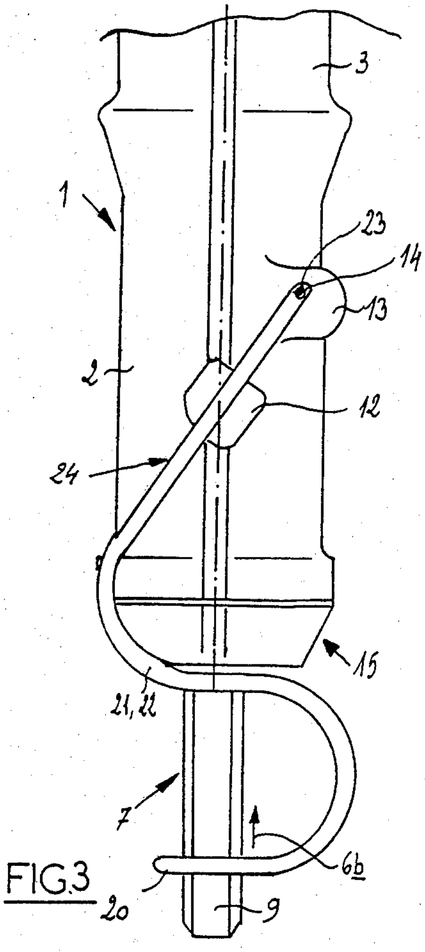
FIG. 3 is a side view of the lower part of the concrete breaking jack hammer equipped with a spring type shifter.
Figure 4:
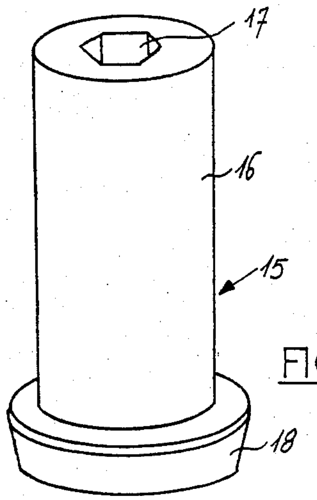
FIG. 4 is a view of the guide sleeve.

Moreover, on its outside walls, the barrel 2 is equipped with pitched contact surfaces 12 and lugs 13 which are pierced by coaxial holes 14 as illustrated in FIG. 3, leading into the bore 11. Finally, the guide of the tool 7 consists, for example, of a sleeve 15 shown on FIG. 4. This sleeve 15 includes a cylindrical outside wall 16, which diameter fits the diameter of the bore 11. It is centrally pierced by a hexagonal hole 17 in which slides the shank 8 of the tool 7. The front of the sleeve includes a counterbore or shoulder 18, which rests against the lower face of the barrel 2.

Referring again to FIGS. 3 and 4, the holes 14 pierced in the lugs 13, the pitched support surfaces 12 and the flange 10 are the components which interface with a spring type shifter consisting of a metal pin formed by a thread or wire bent in a double S, both S's being rigidly joined together at their lower part 20 and routed on either side, following 21 and 22, around the barrel 2, the pitched contact surfaces 12 acting as support, so that their upper ends 23 can be introduced into the holes 14. A detachable spring pin 24 is thus obtained, supported by the body of the jack hammer to lock the tool 7 on the barrel 2.

The system operates as follows:

When the worker wishes to free his tool 7 from the concrete for instance, the only operation required is to lift the jack hammer. Using the part 20 of the pin 24, the jack hammer is supported under the flange 10 of the tool, brings the tool upward and frees it.

Figure 5:
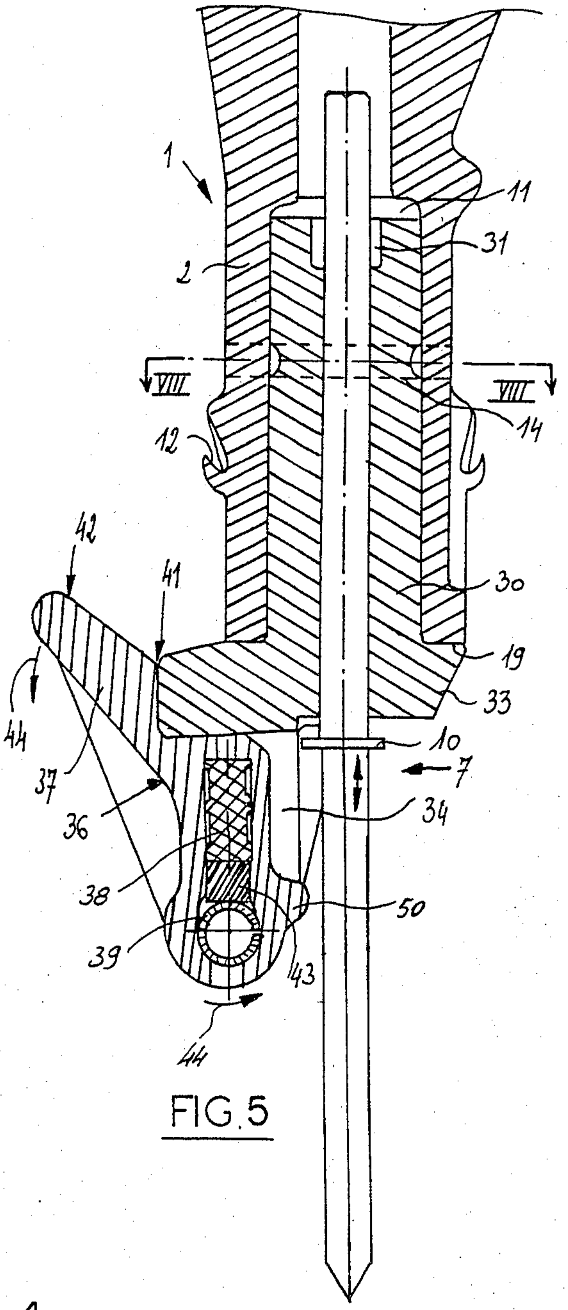
FIG. 5 is a cross section of a jack hammer equipped with a latch type locking system.
Figure 6:
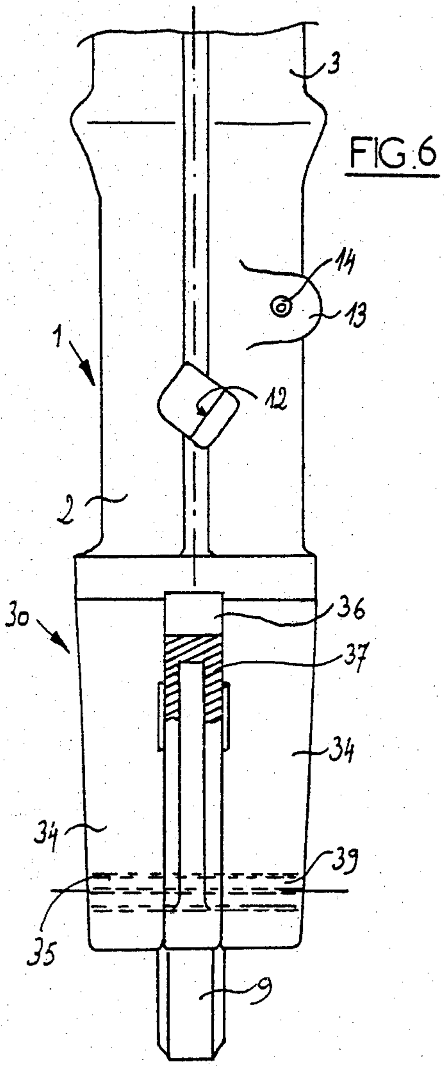
FIG. 6 is a side view, including a partial cross section of the latch, of the version illustrated in FIG. 5.

There is another type of lock, including a latch which is jointed on the base of the jack hammer barrel. In the current arrangements, the structures of these jack hammers differ slightly and the locking systems are therefore not standard. According to this invention, a latch type lock as shown in FIGS. 5 and 6, can be used on a jack hammer, without altering its body. This operation calls for the installation, in the bore 11, of a sleeve 30 illustrated in FIG. 7 and including:

- polygonal, axial hole 31, to guide the tool;
- a peripheral groove 32, spaced in alignment with the coaxial holes 14 provided in the lugs 13, as the lower counterbore or shoulder 33 of the sleeve comes to stop in the base 19 of the body;
- a flange 34, acting as a fork-joint for the latch.

The popular pivot latch shown in FIGS. 5 and 6, consists of a grooved section 37, shaped into a V. One of the branches of this V is hollow, in order to house a return device 38 and the split pivot pin 39. Finally, the end of this branch is externally shaped as a cam including an offset part 50 which can be used to stop the flange 10 (FIG. 5), as the latch is pivoted.

Figure 7:
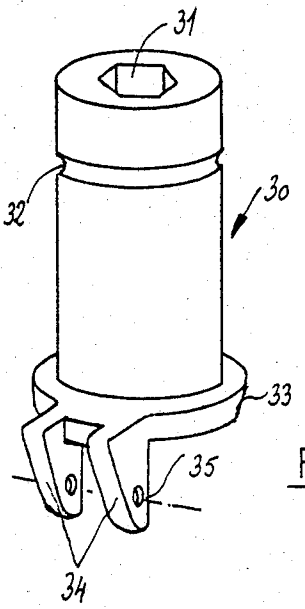
FIG. 7 is a view of the guide sleeve in the latch type version.
Figure 8:
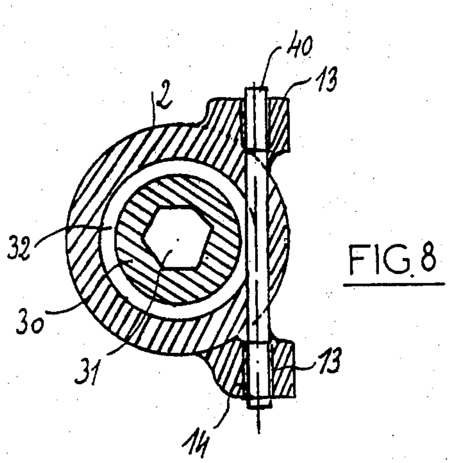
FIG. 8 is an VIII—VIII (FIG. 5) cross section, which illustrates the installation of a lock pin.

The assembly and installation of the tool locking device are described in the following procedure with reference to FIGS. 5, 6 and 7:

(a) the sleeve 30 is press fit into the bore 11 until the peripheral groove 32 is aligned with the holes 14 ending in the bore 11. The sleeve can then be locked on the body, by introducing a pin 40 in the holes 14. This pin rigidly holds the sleeve and the barrel FIG. 8 illustrates the assembly;

(b) the tool 7 is introduced, bottom part first, in the polygonal slide guide 31 until the flange 10 reaches the upper position;

(c) the pivot pin 39 mounted in latch 36 is installed in the flange formed by the two lugs 34 which remain rigid with the sleeve.

FIG. 5 shows the latch in normal position, the offset portion of the cam 50 coming across the axial travel of the flange 10. During the operation of a jack hammer equipped with this locking device, the offset portion 50, therefore the latch 36, and therefore the sleeve 30 are subjected to a stress requiring that the sleeve be locked by the pin 40.

It is apparent that when the latch is raised as shown in FIG. 5, the tool 7 cannot part from the body 1. Actually, the shocks produced between the flange 10 and the offset portion 50 are absorbed by the sleeve, but do not allow the latch 36 to pivot, its upper branch resting, in 41, against the counterbore or shoulder 33. However, if a replacement of the tool is desired (to sharpen the working part 9, for instance), a light downward pressure (arrow 42) on the latch 36 is required to slide the split pin 39 in the groove 35, this latch should then be pivoted following the arrow 44. The downward pressure 42 disengages the horizontal part of the contact surface 41, and the pivoting 44 takes the offset portion 50 away from the travel of the flange 10. The tool can then be easily disengaged from the bottom.

Referring to FIGS. 3 and 5, it is clear that the sleeve 30 could be used for a locking system consisting of a spring type shifter. The pin 40 would be replaced by the ends 23 of the spring pin, and the flange formed by the lugs 34 of the sleeve would not be used.

Furthermore, the invention is not limited to the above examples. The invention would remain applicable even in the case where the design of the body and the sleeves should be modified. The main advantage of this invention is to allow the installation of the two most commonly used locking systems on the same jack hammer including a body 1 and the required controls for the operation and the distribution of compressed air. A "universal" jack hammer is thus obtained.

What is claimed is:

1. A reciprocating piston operated jack hammer device for breaking concrete utilizing mutually exclusively a latch type and a spring-type shifter, said device comprising:
   - a one piece housing having one end portion; an opposite end portion housing said piston; and a central bore therethrough;
   - a sleeve member mounted in the central bore of said one end portion of the housing, said sleeve member having a shoulder abutting said one end portion of the housing, said sleeve member further having an axial passage;
   - means for mounting said sleeve member to said housing;
   - a tool member having a shank portion, a working end portion and a flange therebetween, said shank portion being slidably mounted in said axial passage of the sleeve member;
   - means for interchangeably securing a latch type shifter with a spring type shifter to said housing, said securing means further including:
     - at least one pitched contact surface on the external surface of said one end portion of the one piece housing:
     - two spaced lugs located on the external surface of the housing, said lugs having coaxial holes for receiving a spring type shifter, said holes intersecting said central bore of the housing;
     - means for removably securing a latch type shifter to said sleeve member;
     - means limiting slidable movement of said tool member to a predetermined position in a direction away from said sleeve member; and
     - means for mounting said limiting means to said housing so that when said piston strikes said tool member to slidably move said tool member in a direction away from said piston, said limiting means engages said flange of the tool member to prevent said tool member from sliding beyond a predetermined distance from said sleeve member and such that when said tool member slidably moves in a direction towards said piston, said flange of said tool member engages said sleeve member to terminate slidable movement towards said piston.

2. The reciprocating piston operated jack hammer as claimed in claim 1 further comprising:
   - a pair of spaced apart flanges mounted to said shoulder of the sleeve member, said flanges having coaxial holes; and means for mounting said flanges to said shoulder for cooperation therewith.

3. The reciprocating piston operated jack hammer as claimed in claim 1 wherein said limiting means further comprises a double S shaped pin having free upper ends terminating in right angle bent edges and lower ends joined to each other, said pin being mounted on said housing with the right angle bent upper ends located in the holes of the spaced lugs, the central portion of said double S shaped pin engaging said pitched contact surface of said external surface of the housing and said lower ends of the pin surrounding the tool member working end, such that, the flange of the tool member engages the lower ends of the double S pin member to limit the axial movement of said flange of the tool member when the tool member moves in a direction away from the sleeve member.

4. The reciprocating piston operated jack hammer as claimed in claim 2 wherein said means for mounting said sleeve member further comprises:

a groove circumscribed about the outer surface of the sleeve member, said groove being located axially so as to align with said coaxial holes of the two spaced lugs when said sleeve member is mounted in the central bore of said one piece housing; and a pin member slidably mounted in said coaxial holes and groove of the sleeve member so as to axially retain the sleeve member in said central bore of the housing.

5. The reciprocating piston operated jack hammer as claimed in claim 1 wherein said means for mounting said limiting means further comprises a pair of spaced apart flanges mounted to said shoulder of the sleeve member, said flanges having coaxial holes for receiving said limiting means.

6. The reciprocating piston operated jack hammer as claimed in claim 4 wherein said limiting means further comprises:

a latch member mounted between said spaced apart flanges for cooperation therewith, said latch member further mounted adjacent said shoulder of the sleeve member to cooperate therewith, said latch member having a cam portion including an offset part, said offset part positioned relative to said flange of the tool member such that the flange of the tool member engages said offset part to limit the axial movement of said flange of the tool member when the tool member moves in a direction away from said housing; and means for mounting said latch member to said pair of spaced apart flanges.

7. The reciprocating piston operated jack hammer as claimed in claim 1 wherein said means for mounting said limiting means further comprises a pair of spaced apart flanges mounted to said shoulder of said sleeve member, said flanges having coaxial holes for receiving said limiting means.

8. The reciprocating piston operated jack hammer as claimed in claim 2 wherein said limiting means further comprises a double S shaped pin having free upper ends terminating in right angle bent edges and lower ends joined to each other, said pin being mounted on said housing with the right angle bent upper mounted in the holes of the spaced lugs, the central portion of said double S shaped pin engaging said pitched contact surface of said outer surface of the housing and said lower ends of the pin surrounding the tool member wrecking end such that the flange of the tool member engages the lower ends of the double S pin member to limit the axial movement of said flange of the tool member when the tool member moves in a direction away from the housing.

9. The reciprocating piston operated jack hammer as claimed in claim 5 wherein said limiting means further comprises:

a latch member mounted between said spaced apart flanges for cooperation therewith, said latch member further mounted adjacent said shoulder of the sleeve member to cooperate therewith, said latch member having a cam portion including an offset part, said offset part positioned relative to said flange of the tool member such that the flange of the tool member engages said offset part to limit the axial movement of said flange of the tool member when the tool member moves in a direction away from said housing; and means for mounting said latch member to said pair of spaced apart flanges.

* * * * *